(12) United States Patent
Prasad et al.

(10) Patent No.: US 7,509,207 B2
(45) Date of Patent: Mar. 24, 2009

(54) TURBINE ENGINE NOISE REDUCTION

(75) Inventors: Anil Prasad, Vernon, CT (US); Oliver V. Atassi, Longmeadow, MA (US)

(73) Assignee: United Technologies Corporation, Hartford, CT (US)

( * ) Notice: Subject to any disclaimer, the term of this patent is extended or adjusted under 35 U.S.C. 154(b) by 211 days.

(21) Appl. No.: 11/633,863

(22) Filed: Dec. 5, 2006

(65) Prior Publication Data

US 2008/0133104 A1    Jun. 5, 2008

(51) Int. Cl.
*G06F 19/00* (2006.01)
(52) U.S. Cl. .................. 701/100; 701/123; 477/30
(58) Field of Classification Search .......... 701/100, 701/123; 477/30
See application file for complete search history.

(56) References Cited

U.S. PATENT DOCUMENTS 4,137,992 A    2/1979 Herman
5,457,662 A * 10/1995 Forster ................. 367/119
6,108,270 A *  8/2000 DePoy, II .............. 367/124
2002/0061110 A1  5/2002 Kobayashi

* cited by examiner

*Primary Examiner*—Gertrude Arthur Jeanglaud
(74) *Attorney, Agent, or Firm*—Kinney & Lange, P.A.

(57) ABSTRACT

A method for determining how well configurations for a gas turbine propulsion system attain selected acoustic wave energy emissions criteria based on acquiring a plurality of acoustic frequency spectra representations of a noise representation therefor over an operating duration. Relative peaks in the acoustic frequency spectra representations are then located and the forms of at least one of those peaks is altered with respect to acoustic frequency in manners substantially matching acoustic wave energy emissions changes corresponding to configuration changes in gas turbine propulsion systems which are then evaluated to provide an operating parameter noise value. One of those operating parameter noise values that best meets the selected acoustic wave energy emissions criteria is used to aid in determining corresponding configurations changes to thereby better meet those criteria. This foregoing method can be incorporated into a process for determining an overall configuration for a gas turbine propulsion system.

20 Claims, 7 Drawing Sheets

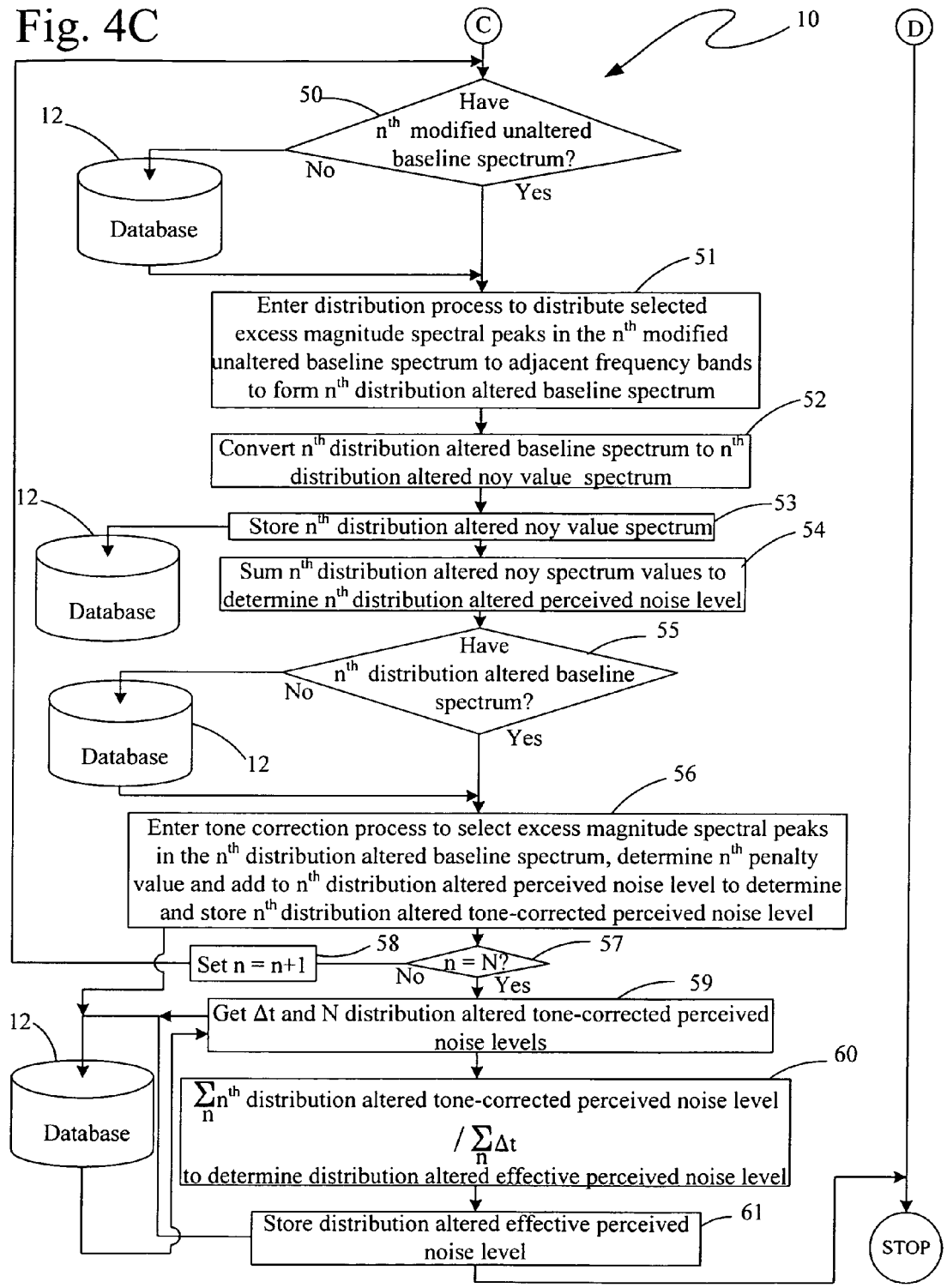

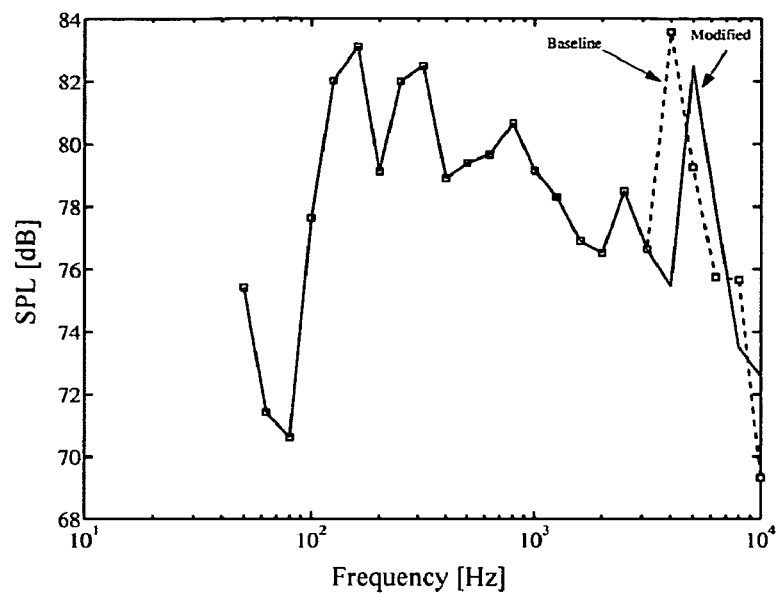
Fig. 5
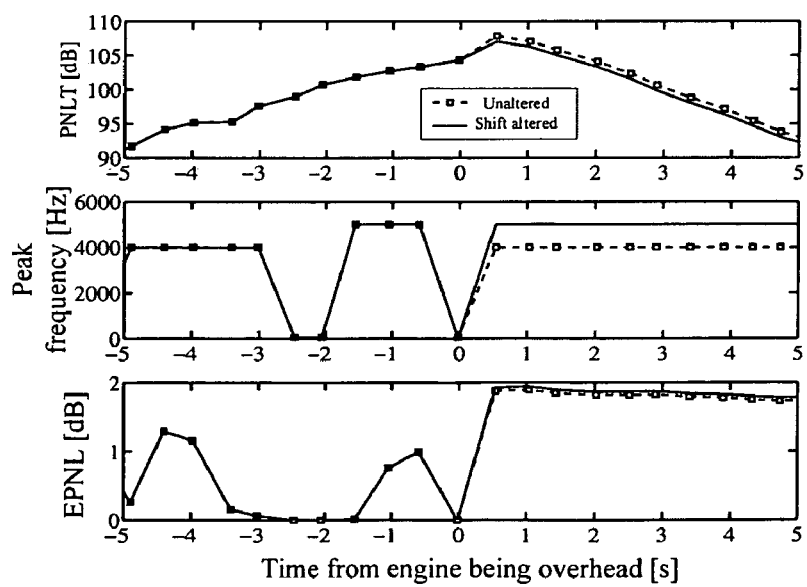
Fig. 6A
Fig. 6B
Fig. 6C

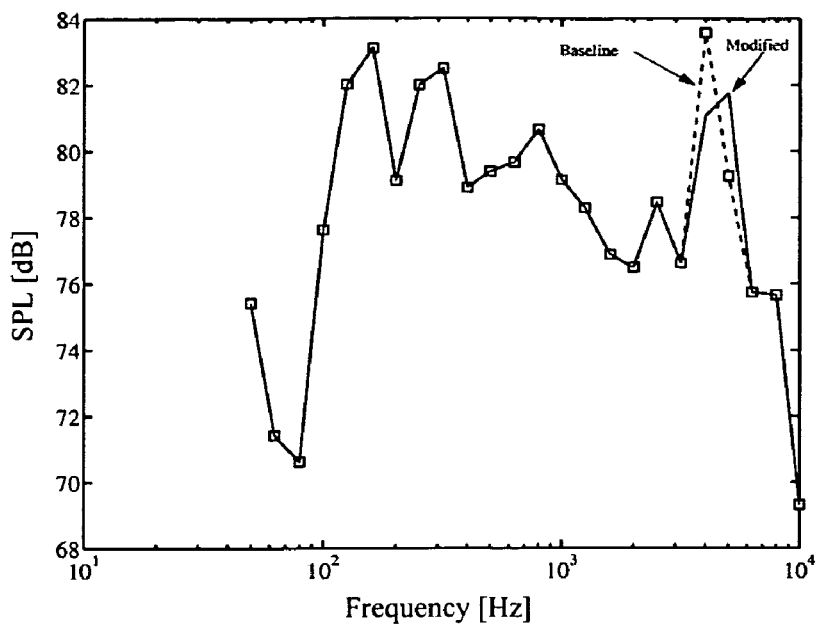
Fig. 7
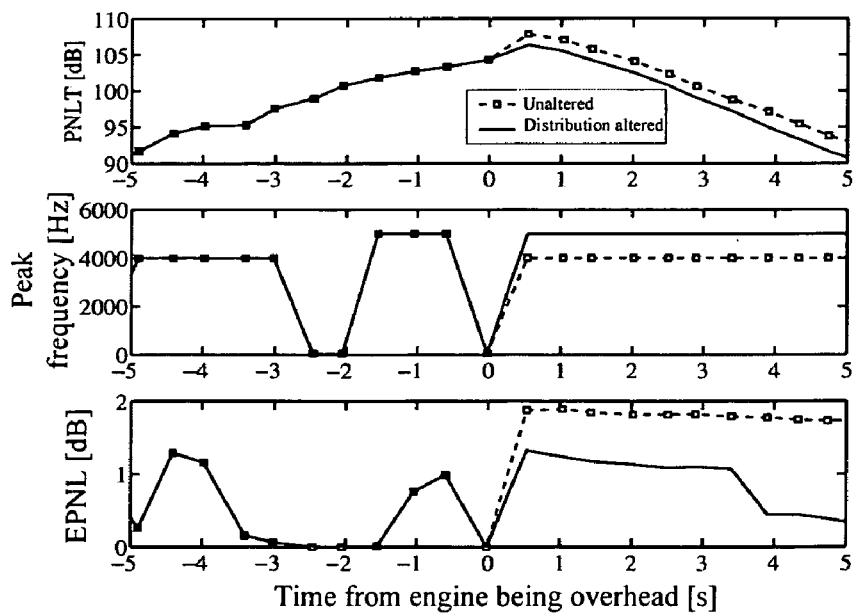
Fig. 8A
Fig. 8B
Fig. 8C

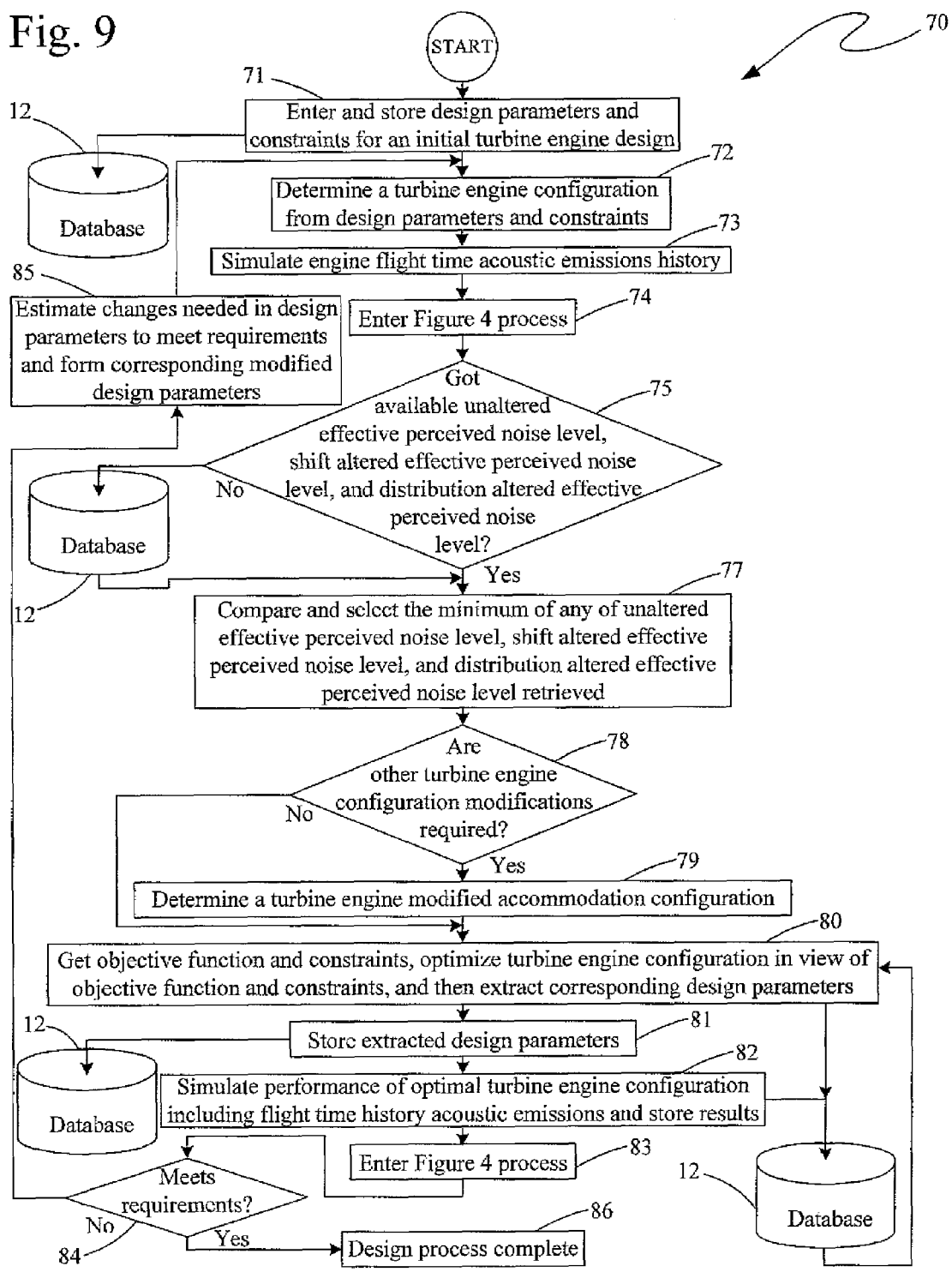

TURBINE ENGINE NOISE REDUCTION

BACKGROUND OF THE INVENTION

The present invention relates to aircraft noise and, more particularly, to the reducing of such noise.

The procedure to certify that an airframe and engine configuration of a modern aircraft meets the requirements imposed by the International Civil Aviation Organization (ICAO) and the Federal Aviation Administration (FAA) explicitly require that the acoustic emissions therefrom, or noise, either attain or be less than the minimum noise specifications that are part of these requirements. Those specifications are dependent on, among other factors, the gross weight of the aircraft. In recent years, certification that these minimum noise requirements for an aircraft have been met has assumed an increased significance due to the more stringent environmental constraints that have been imposed by the ICAO. Specifically, the introduction of new Stage 4 noise restrictions has motivated airframe and engine manufacturers alike to seek out methods to not only attenuate the generated noise but to also minimize the noise generated at the sources thereof through improved designs.

Various studies have clearly demonstrated that the dominant contributor of noise from an aircraft is the gas turbine engine propulsion system in those aircraft in which they are installed. The noise that emanates from such a system can be classified into tonal and broadband spectral components. Tonal noise, characterized by relatively substantial and isolated peaks in the noise frequency spectrum, is generated by aerodynamic interactions between turbomachine airfoils circumferentially mounted on outer surfaces of rings to thereby form blade rows. The frequency of these spectral peaks is determined by the number of airfoils on a ring, the number of such rings and the rotational speed of the shaft on which these rings are rotatably mounted. From the perspective of the effects of such noise on communities, tonal noise is known to be the more annoying of these noise components, a fact that is accounted for in the methodology used to quantify overall aircraft noise as described below.

The noise emission characteristics of an aircraft for certification purposes are determined using procedures specified by the ICAO. In brief, the frequency spectra of noise generated by the aircraft during a specified trajectory, recorded either during an actual flight test or simulated numerically from static engine noise data projected along the flight path, are used to generate a flight time history of the perceived noise level corresponding thereto. Noise spectra under ICAO procedures are generally measured by a spectrum analyzer at each successive sampling time (e.g. sampling of the sound pressure level every ½ second) over this flight time past a location at a uniformly spaced set of acoustic frequencies (e.g. at selected frequencies separated from adjacent ones by 16 Hz) in a range of acoustic frequencies. An example of such a measured spectrum at one sampling instant is shown in the graph of FIG. 1 as plot 1, the measured spectrum, in which the sound pressure level (SPL) measured in decibels (dB) is plotted against acoustic frequency measured in Hertz (Hz). Such 'narrow-band' spectra are converted to equivalent ⅓ octave-band spectra by lumping acoustic energy within 24 logarithmically-spaced acoustic frequency bands in the acoustic frequency range between 50 Hz and 10000 Hz, as defined by the ICAO. A ⅓ octave-band spectrum plot, 2, corresponding to measured spectrum 1 is also shown in the FIG. 1 graph for the same sampling instant.

Such spectra are converted to perceived noise level (PNL) by a weighting procedure that accounts for the annoyance that has been determined to be experienced by the human ear, using corresponding 'noy' values which are a function of both the acoustic frequency, measured in Hertz, and the sound pressure level, measured in decibels, again as defined by the ICAO in corresponding tables. A typical example of the variation of noy values over acoustic frequency is shown in FIG. 2 at three different typical sound pressure level values, 3', 3" and 3''', encountered in the estimation of noise generated by aircraft. This weighting procedure involves, in the present example, taking the sound pressure level for each frequency band in plot 2 of FIG. 1 and obtaining, from the ICAO noy tables using interpolation as needed, the corresponding noy value for that frequency band to provide a noy value spectrum. These noy values are then summed across the acoustic spectrum frequency range in the noy spectrum to determine the perceived noise level given in decibels for this sampling instant. This perceived noise level is then required to be modified in value based on the spectral severity of the most significant tone, in accord with a corresponding ICAO procedure, to result in a perceived noise level, tone-corrected, (PNLT) that is also given in decibels. In this procedure, prominent peak noy values are identified through a prescribed complex frequency analysis methodology, as well as the acoustic frequencies at which the value or values occur from the noy spectrum. If these peak noy values protrude above the adjacent spectral portions resulting from the random acoustic energy or noise emissions sufficiently, the value of the required modification of the perceived noise level for this peak, i.e. the penalty, is obtained from the corresponding ICAO tables in decibels and combined with the previously determined value for the perceived noise level to provide the tone-corrected perceived noise level value for this sampling instant. The magnitude of the penalty is based on the frequency at which the noy peak occurs and the amount that the peak exceeds the random noise spectral portions in the adjacent ⅓ octave frequency bands. Determining this penalty involves the rate at which the spectral amplitude changes from the ⅓ octave frequency band in which the peak occurs to those bands adjacent to the peak containing band, that is, the slope of the spectrum in the locality of the peak The tone-corrected perceived noise level for each sampling instant is summed over the flight time history and averaged thereover through dividing this sum by the total elapsed time in that flight time history to yield an effective perceived noise level (EPNL). This result, again given in decibels, is the measure of emitted aircraft noise signature solely relied upon by the ICAO for each relevant acoustic condition including a) the sideline condition in which there is full aircraft engine power propulsion past the acoustic measuring instrument, b) the cutback condition in which engine power is much reduced as occurs as the aircraft reaches a desired altitude following a takeoff, and (c) the approach condition in which engine power is reduced with wing flaps and landing gear down as occurs for the aircraft approaching a landing. This noise evaluation result will be substantially influenced by the ICAO emphasis on annoyance of those within earshot of the aircraft as indicated in FIG. 2 because of the plots therein showing that tonal peaks in the acoustic frequency range of 3000 to 4000 Hz exhibit relatively large noy values as defined by the ICAO. Any occurrence of a dominant tonal peak in this frequency range will be a very significant contributor to the EPNL value for an aircraft. Sound waves are attenuated as they travel through the atmosphere with this attenuation (characterized by a coefficient, α) being weakly dependent on atmospheric temperature and humidity. This atmospheric attenuation does, however, depend significantly on frequency in a manner such that sound waves at higher frequencies are more attenuated than those at lower frequencies as shown in a plot, 4, in the graph of FIG. 3. Plot 4 is of the atmospheric sound pressure attenuation coefficient versus frequency after it has been normalized by the value of that coefficient at the acoustic frequency of 50 Hz. Thus, any method of increasing the frequency location, i.e. a spectral upward shifting, of a tonal peak in the spectral range given above for relatively large noy values will result in a decrease in the EPNL value for an aircraft by virtue of two separate and independent effects: a reduction in the noy value associated with the tone as can be seen in FIG. 2 for such a frequency location shift, as well as the further benefit provided by the increased atmospheric attenuation resulting from such an upward frequency shift as shown in FIG. 3.

However, increasing or shifting upward the frequency of a tonal peak can also result in a small penalty incurred because of the ICAO tone correction or modification requirement with respect to the perceived noise level indicated above. A tonal peak modification at a specific frequency is based, under the requirement, on the rate of change of the SPL value as a function of frequency, or the local slope of the spectrum. Hence, the contribution by a tone depends not only on the SPL value of the peak of that tone but also on its value with respect to the spectral components in the adjacent ⅓ octave frequency band or bands. Consequently, care needs to be exercised in altering a tonal peak over a portion of the frequency spectrum so as not to incur an offsetting penalty from its corresponding required tone modification. Thus, there is desired a method whereby reductions in aircraft EPNL values are achieved by shifting the frequency of a tone or by reducing its required tone modification, or both, corresponding to changes in the engine configuration, that are simulatable to allow predicting the results of such tonal peak alterations and optimizible to aid in the selection of engine aerodynamic design parameters to attain a desired value of EPNL therefor.

BRIEF SUMMARY OF THE INVENTION

The present invention provides a method for determining how well configurations for a gas turbine propulsion system attain selected acoustic wave energy emissions criteria based on acquiring a noise representation of acoustic energy emissions for a gas turbine propulsion system of an initial configuration over an operating time duration and providing a plurality of acoustic frequency spectra representations of the noise representation each corresponding to one of a plurality of selected sample times occurring during the operating time duration. Relative peaks in the acoustic frequency spectra representations are then located and the forms of at least one of those peaks is altered with respect to acoustic frequency in manners substantially matching acoustic wave energy emissions changes corresponding to configuration changes in gas turbine propulsion systems to thereby form altered acoustic frequency spectra representations. Evaluating each altered acoustic frequency spectra representation is undertaken to provide a corresponding noise parameter value for each to together provide a plurality of noise measurement parameter values that are averaged to provide an operating parameter noise value. One of those operating parameter noise values that best meets the selected acoustic wave energy emissions criteria is used to aid in determining corresponding configuration changes to thereby better meet those criteria. This foregoing method can be incorporated into a process for determining an overall configuration for a gas turbine propulsion system.

BRIEF DESCRIPTION OF THE DRAWINGS

FIGS. 4A, 4B and 4C show flow charts embodying the present invention, FIG. 5 shows a graph displaying plots of acoustic emissions spectra representations in connection with the present invention, FIGS. 6A, 6B and 6C show graphs having plots indicating the results achieved using the present invention in connection with the representations in FIG. 5, FIG. 7 shows a graph displaying plots of acoustic emissions spectra representations in connection with the present invention, FIGS. 8A, 8B and 8C show graphs having plots indicating the results achieved using the present invention in connection with the representations in FIG. 7, and FIG. 9 shows a flow chart embodying the present invention.

DETAILED DESCRIPTION

Figure 1:
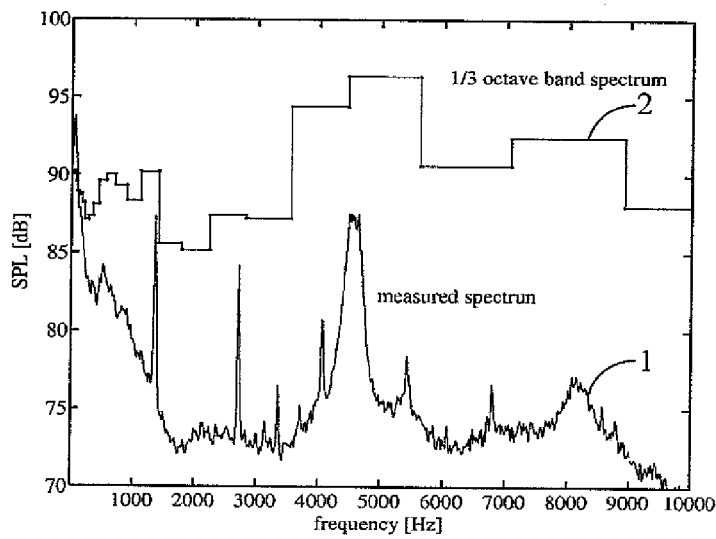
FIG. 1 shows a graph displaying plots of acoustic emissions spectra representations.
Figure 2:
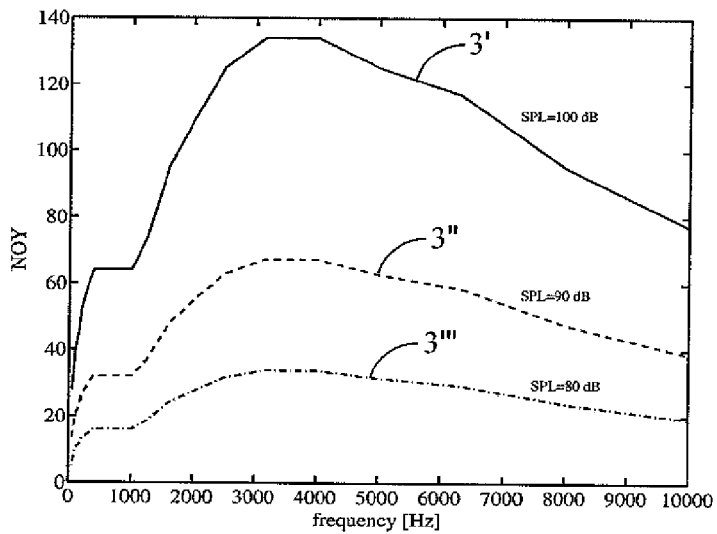
FIG. 2 shows a graph displaying plots indicating emission spectra modification values.

Whether a sound pressure peak in the noise frequency spectrum of a gas turbine engine propulsion system leads to being outside the noise requirements imposed by the ICAO is based on the baseline spectrum having that peak and the corresponding noy value spectrum, and on sound pressures at frequencies further along the frequency scale in those spectra that are rapidly attenuated by the atmosphere. Thus, as indicated above, an engine configuration that produces acoustic emission peaks that a) have corresponding noy values occurring farther along the frequency scale, that is, at frequencies past the frequency range of the maxima in the noy value versus frequency characteristics to frequency ranges where the sound pressures in those characteristics are declining in value with increasing with frequency, and b) that occur in frequency ranges where the atmospheric attenuation is increasing with increasing frequency, will realize diminished values for its corresponding EPNL.

In a turbofan gas turbine engine in an aircraft, the acoustic noise emissions from the front of the engine are typically caused by the fan and the low pressure compressor and those emissions from the rear of the engine are typically caused by the low pressure turbine. The frequencies at which the tonal, or spectral, peaks occur in those emissions are typically set by the rotational speed of the rotors in such fans, compressors and turbines, and by the number of airfoils supported on those rotors. Such peaks are usually traceable from the acoustic data taken for the engine to the causal one of those rotors. Shifting along the frequency scale a tonal or spectral peak occurring in the acoustic emissions of a gas turbine engine at corresponding frequencies in one configuration thereof to thereafter occur at other frequencies can physically be achieved by altering that configuration of the engine in one or more manners that include, but are not restricted to, the following:

1) increase the number of airfoils supported on a rotor causing the peak so as to position that tonal or spectral peak at a location in a frequency band further along the frequency scale, or to position it at a location straddling the boundary between two adjacent frequency bands so as to have that peak occur at frequencies in both adjacent bands.

2) increase in the rotational speed of a rotor causing the peak so as to position that tonal or spectral peak at a location in a frequency band further along the frequency scale, or to position it at a location straddling the boundary between two adjacent frequency bands so as to have that peak occur at frequencies in both adjacent bands.

3) increase the number of airfoils supported on one rotor and decrease the number of airfoils supported on another rotor each contributing to causing the same peak so as to have two peaks each occurring at different frequencies one in each of adjacent frequency bands.

The first of the manners above, in which tonal or spectral peaks are shifted farther along the frequency scale through the engine configurational change of adding to the number of airfoils on the rotor causing that peak, is usually the easiest to implement. The third of those manners above, involving altering in different ways the counts of airfoils supported on each of the rotors jointly contributing to a peak, is also relatively easily implemented. The second manner above involving changing the rotational speed of the rotor causing that peak is usually substantially more difficult, other than relatively quite small speed changes, because of requiring an operating point change for the engine.

Because of the correlation between such engine configurational changes and the locations of the resulting tonal or spectral peaks in the acoustic emission versus frequency characteristics of the reconfigured engine, and similarly, because of the correlation between the previous engine configuration and the locations of the tonal or spectral peaks in its acoustic emissions characteristic, the effects of configurational changes on the engine acoustic emissions characteristics can be well simulated by a suitably programmed computer. These simulation results can then be subjected by a suitable program in that computer to the ICAO noise requirements to thereby determine whether those requirements have been met or not by the engine configuration changes, or at least to determine how much closer the reconfigured engine is to meeting those requirements because of those configurational changes with respect to the previous engine configuration without those changes.

Figure 4A:
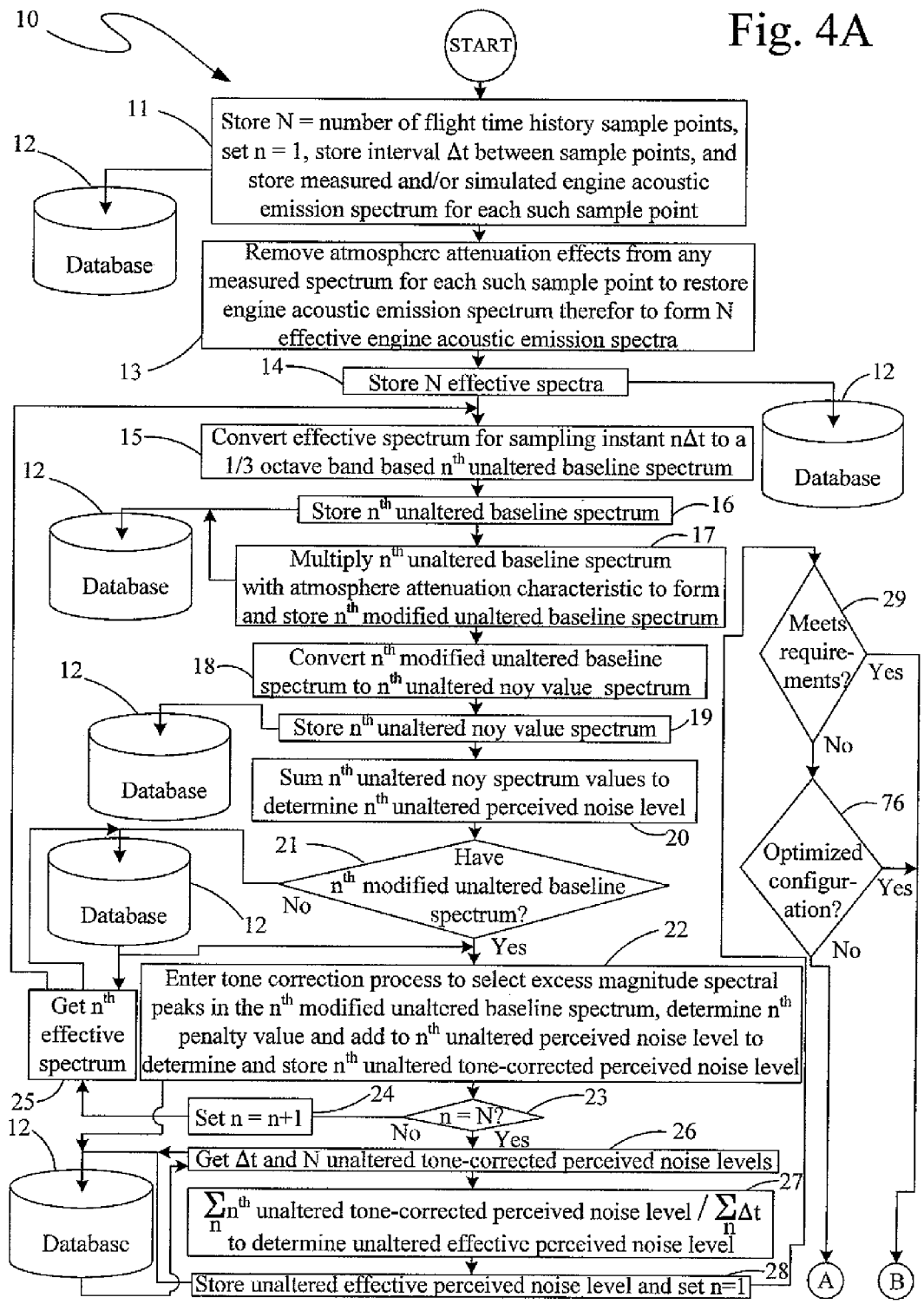

A flow chart, 10, for such computer programs is shown in FIG. 4 beginning at the START balloon in FIG. 4A. From there the computer begins in a block, 11, by storing in a database, 12, the results of spectrum analyzer measurements obtained following ICAO measurement rules of the engine acoustic noise at N points in time emitted over the time of flight in flight tests of that engine flown suitably with respect to the measurement location, or the spectral results of the simulated emitted noise in a computer based simulation of such a flight at N points over the simulated time of the simulated flight of the engine, as well as the time interval $\Delta t$ selected between each of the adjacent ones of those N time points. Also, a sample counter in the computer is set to n=1 to count the first of the number of emission spectra out of the N acoustic emission spectra stored for a flight or a simulation, each acquired at a corresponding one of the N sample times during such flight or simulation, which have been operated on by the computer in determining the corresponding effective perceived noise level of the engine in that flight or that simulation in accord with the ICAO noise evaluation rules.

In addition for the initial engine acoustic emission data preparation in the situation of actual flight tests, the computer goes on in a further block, 13, of the engine to a) transform this data into data equivalent to that which would result from being measured by the spectrum analyzer at a fixed distance of 150 ft. from the engine as required by the ICAO rules, and to b) remove the atmospheric attenuation effects in the spectrum analyzer data to thereby form effective static engine acoustic emissions spectra that are a truer representation of the actual noise emissions of the engine. Simulated spectra need not have such an operation performed thereon as they are determined at the static engine location and so are already effective spectra. The N effective spectra from either measurement during flight or simulation are stored in database 12 by the computer in a block, 14, to complete the initial engine acoustic emission data preparation.

Figure 3:
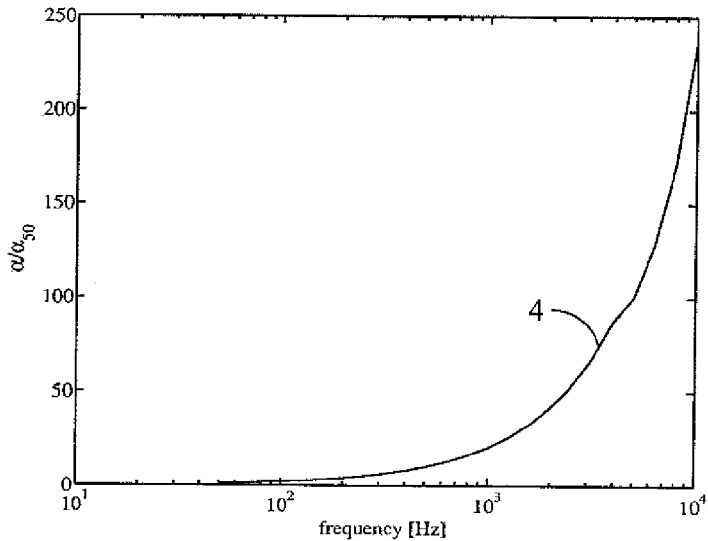
FIG. 3 shows a graph displaying a plot of a normalized atmospheric attenuation parameter.

Having this engine acoustic emission data basis in the form of effective acoustic spectra, these spectra are next evaluated following the ICAO rules to determine the noise characteristics of the corresponding engine as indicated above. The $n^{th}$ effective spectrum, starting with the first, is converted in a block, 15, to equivalent ⅓ octave-band spectra as described above so that the effective spectrum for sampling instant $n\Delta t$ becomes the $n^{th}$ unaltered baseline spectrum based on that effective spectrum. This $n^{th}$ unaltered baseline spectrum is stored in database 12 by the computer in a further block, 16, and also multiplied in another block, 17, by an atmosphere attenuation characteristic, such as plot 4 in FIG. 3, to form an $n^{th}$ modified unaltered baseline spectrum which is stored in database 12.

This $n^{th}$ modified unaltered baseline spectrum is further converted to a $n^{th}$ unaltered noy value spectrum in a following block, 18, as described above, and stored in database 12 in a subsequent block, 19. The noy values in this $n^{th}$ shift altered noy value spectrum are then summed by the computer in a further block, 20, across the acoustic spectrum frequency range in this last found spectrum to determine the corresponding perceived noise level for this $n\Delta t$ sampling instant also as described above. The computer determines in a decision diamond, 21, whether it still has the $n^{th}$ modified unaltered baseline spectrum from block 17 following the summation in block 20 to proceed further, or whether it must retrieve the $n^{th}$ modified unaltered baseline spectrum from database 12 to proceed further.

The computer, upon so being ready to proceed further, enters the tone correction process in a subsequent block, 22, to select excess magnitude spectral peaks in the $n^{th}$ modified unaltered baseline spectrum, and to therefrom determine the corresponding penalty value, as described above. The computer adds this penalty value to the corresponding $n^{th}$ perceived noise level to thereby determine the $n^{th}$ unaltered tone-corrected, or tone-modified, perceived noise level (PNLT). Upon completing this determination of the $n^{th}$ unaltered tone-corrected, or tone-modified, perceived noise level corresponding to the $n^{th}$ effective spectrum, the computer checks the sample counter to determine in a decision diamond, 23, if the count n kept therein has reached N. Such a count value indicates that all of sample spectra for a flight or simulation have been operated on by the computer to determine the effective unaltered perceived noise level for that flight or simulation. If not, the computer increments the sample counter in a further block, 24, retrieves the next sample effective spectrum from database 12 in another block, 25, and returns ahead of block 15 to operate on this next sample effective spectrum.

If all of the sample effective spectra have been operated on by the computer, the sample counter has n=N and the computer in a subsequent block, 26, retrieves from database 12 the N stored unaltered tone-corrected, or tone-modified, perceived noise levels, one for each sample effective spectrum, and $\Delta t$. The computer then sums in a further block, 27, these N stored unaltered tone-corrected, or tone-modified, perceived noise levels and divides the result by the total time $N\Delta t$ of the flight or the simulation to average these N stored unaltered tone-corrected, or tone-modified, perceived noise levels over the time of the flight or simulation. Thus, the computer thereby provides the unaltered effective perceived noise level (EPNL) of that flight or simulation in accord with the ICAO noise evaluation rules which is stored in database 12 in a next block, 28.

This result for the unaltered effective perceived noise level (EPNL) of that flight or simulation is checked in a decision diamond, 29, to determine if the ICAO rules limits have been met thereby, and so by the engine configuration from which the acoustic emission spectrum or simulation was obtained. If not, the computer goes through balloon A to FIG. 4B (skipping through a decision diamond not of concern here but will be involved in a further process described below) to begin a baseline spectrum spectral peak redistribution process versus frequency corresponding to an engine reconfiguration to find a configuration meeting the ICAO rules limits. If, in the alternative, these rules limits have been met by the EPNL result, the computer goes through balloons B and D in FIG. 4 to end this evaluation and reconfiguration process in the STOP balloon in FIG. 4C.

If these rules limits have not been met by the EPNL result, an engine configuration change is required to mitigate the effects of the offending tonal or spectral peak, or peaks, giving rise to this failure. As indicated above, the easiest engine configurational change to implement is based on increasing the number of airfoils on the engine rotor or rotors appearing to be the source of the foregoing failure to meet the ICAO noise limits. A change of this nature, then, is the first resort and an estimate in this regard needs to be made as to the needed increase in airfoil numbers on such a rotor, within the realm of physical and economic possibility, that will lead to a sufficient shift of the tonal or spectral peaks outward along the emissions frequency scale to result in meeting these limits, a configuration change which then must be evaluated to determine if indeed the limits are now met by the proposed reconfigured engine.

Figure 4B:
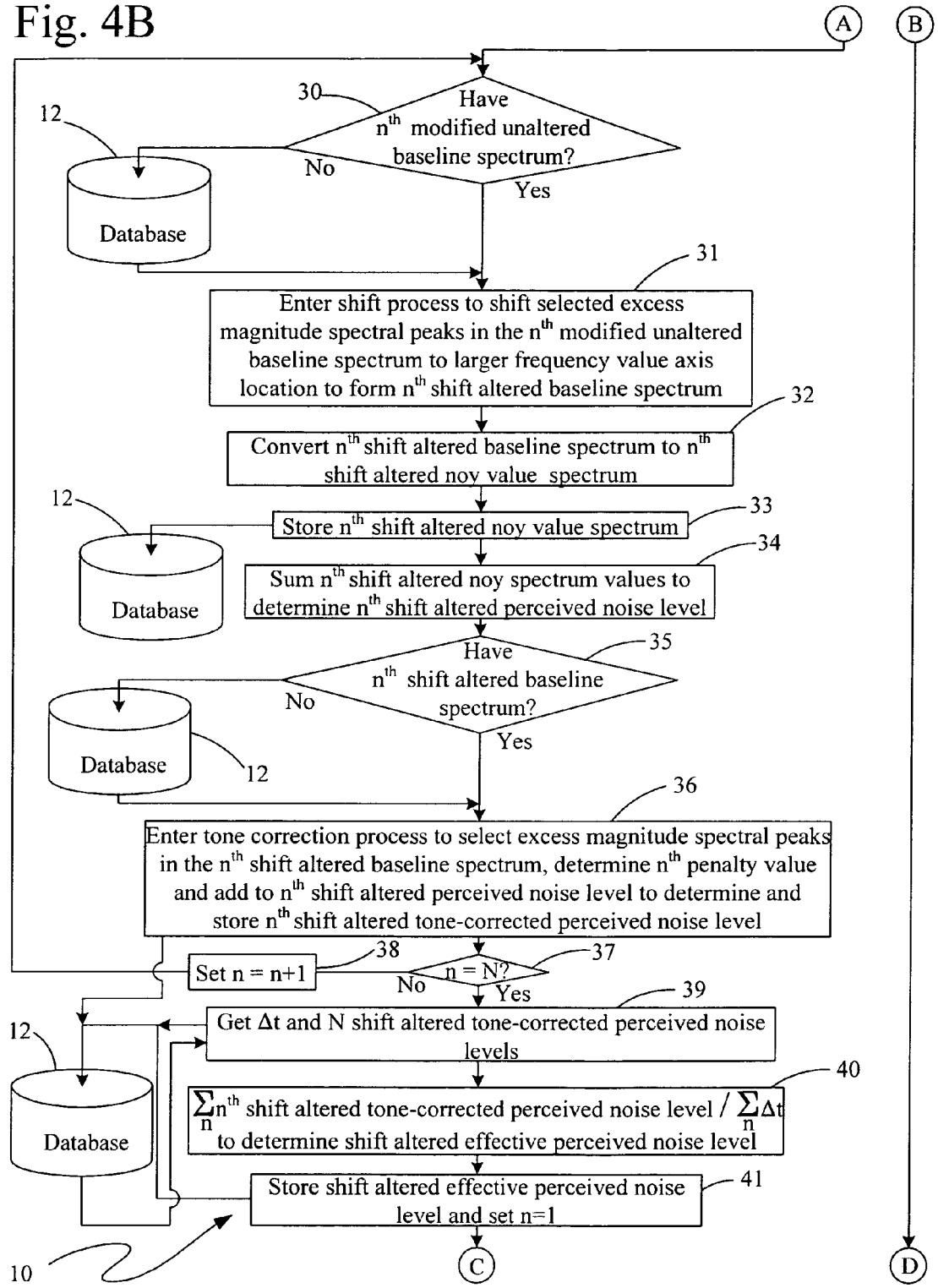

This is undertaken by the computer in FIG. 4B after the start balloon designated A which has been reached from FIG. 4A after the failure of the previous engine to meet the ICAO noise rules limits. The computer determines in a decision diamond, 30, whether it has the previously prepared $n^{th}$ modified unaltered baseline spectrum, starting with the first, stored in database 12 in block 16 of FIG. 4A as the basis from which the offending tonal or spectral peak or peaks will be shifted to proceed further, or whether it must retrieve that spectrum from database 12 to proceed. This $n^{th}$ modified unaltered baseline spectrum is then subjected by the computer to the peak shift process in a block, 31, where it uses well known estimation procedures to estimate a sufficient and feasible shift outward along the frequency axis of the estimated offending spectral peak or peaks needed with respect to that spectrum to form the corresponding first shift altered baseline spectrum. These procedures are based on the substantially proportional linearity of the relationship between the number of airfoils on a rotor at a rotational speed and the corresponding acoustic emission frequency.

This $n^{th}$ shift altered baseline spectrum is further converted to a $n^{th}$ shift altered noy value spectrum in a following block, 32, as described above, and stored in database 12 in a subsequent block, 33. The noy values in this last spectrum are then summed by the computer in a further block, 34, across the acoustic spectrum frequency range in this $n^{th}$ shift altered noy value spectrum to determine the corresponding perceived noise level for this $n\Delta t$ sampling instant also as described above. The computer determines in a decision diamond, 35, whether it retained the $n^{th}$ shift altered baseline spectrum from block 31 during the summation in block 34 to proceed further, or whether it must retrieve the $n^{th}$ shift altered baseline spectrum from database 12 to proceed further.

The computer, upon so being ready to proceed further, enters the tone modification or correction process in a subsequent block, 36, to select what have now, after the peak shifting, become the excess magnitude spectral peaks in the $n^{th}$ shift altered baseline spectrum, and to therefrom determine the corresponding penalty value as described above. The computer adds this penalty value to the corresponding $n^{th}$ perceived noise level to thereby determine the $n^{th}$ shift altered tone-corrected, or tone-modified, perceived noise level (PNLT). Upon completing this determination of the $n^{th}$ shift altered tone-corrected, or tone-modified, perceived noise level corresponding to the $n^{th}$ modified unaltered baseline spectrum (and both the $n^{th}$ unaltered baseline and the $n^{th}$ effective spectra), the computer checks the sample counter to determine in a decision diamond, 37, if the count n kept therein has reached N. Such a count value indicates that all of unaltered baseline spectra for a flight or simulation have been operated on by the computer to determine the effective shift altered perceived noise level for that flight or simulation. If not, the computer increments the sample counter in a further block, 38, and returns ahead of decision diamond 30 to operate on this next modified unaltered baseline spectrum.

If all of the modified unaltered baseline spectra have been operated on by the computer, the sample counter has n=N and the computer in a subsequent block, 39, retrieves from database 12 the N stored shift altered tone-corrected, or tone-modified, perceived noise levels (PNLT), one for each sample effective spectrum, and $\Delta t$. The computer then sums in a further block, 40, these N stored shift altered tone-corrected, or tone-modified, perceived noise levels and divides the result by the total time $N\Delta t$ of the flight or the simulation to average these N stored shift altered tone-corrected, or tone-modified, perceived noise levels over the time of the flight or simulation. Thus, the computer thereby provides the shift altered effective perceived noise level (EPNL) of that flight or simulation in accord with the ICAO noise evaluation rules which is stored in database 12 in a next block, 41.

An example of the results of this first estimated reconfiguration is shown in the graph of FIG. 5 in which the midpoints of the frequency bands in the equivalent ⅓ octave-band spectrum formed from an acoustic emission spectrum are plotted. The solid line plot portion up to the dashed line and that dashed line together are the modified unaltered baseline spectrum, and the entire solid line spectrum is the modified shift altered baseline spectrum. The foregoing procedure is shown implementing a shift of a spectral peak at 4000 Hz in the modified unaltered baseline spectrum to a spectral peak at 5000 Hz in the modified shift altered baseline spectrum with, as indicated by use of "modified", the sound pressure level values accounting for atmospheric attenuation.

The unaltered and the resulting shift altered PNLT time variations are shown in FIG. 6A. FIG. 6B shows that reconfiguration alters the location on the emission frequency axis of the maximum spectral peak by having shifted it from 4000 Hz to 5000 Hz, as expected, with an improvement in the associated EPNL values shown in FIG. 6C. The overall benefit in EPNL in this particular example is estimated to be about 0.5 dB.

The next engine reconfiguration resort to be estimated, and then evaluated for emission noise improvement, to determine whether greater emission noise improvements can be made turns to the often more difficult to implement alternatives. These involve changing the numbers of airfoils on multiple rotors involved in the compressors or turbines in providing the offending tonal or spectral peaks and changing the rotation speed of those rotors to thereby distribute a spectral or tonal peak over at least portions of two adjacent frequency bands in the unaltered baseline spectra, and so in the engine acoustic emission spectra. Again, an estimate in this regard needs to be made as to the needed changes in airfoil numbers on such rotors, and the rotational speed changes needed therefor, again within the realm of physical and economic possibility, that will lead to sufficient shift and distributing of the tonal or spectral peaks outward along the emissions frequency scale to result in meeting these limits. Again, these configuration changes must then be evaluated to determine if indeed the limits are now met by the proposed reconfigured engine.

This is undertaken by the computer in FIG. 4C after the start balloon designated C has been reached from FIG. 4B after completing the selection of the peak shifting reconfiguration and the noise evaluation thereof in the process set out in FIG. 4B. The computer determines in a decision diamond, 50, whether it has the previously prepared $n^{th}$ modified unaltered baseline spectrum, starting with the first, stored in database 12 in block 16 of FIG. 4A as the basis from which the offending tonal or spectral peak or peaks will be shifted to proceed further, or whether it must retrieve that spectrum from database 12 to proceed. This $n^{th}$ modified unaltered baseline spectrum is then subjected by the computer to the peak distribution process in a block, 51, where it uses well known estimation procedures to estimate a sufficient and feasible shift outward along the frequency axis of the estimated offending spectral peak or peaks to position and redistribute that peak, or each of the peaks, over two adjacent frequency bands as needed with respect to that spectrum to form the corresponding first distribution altered baseline spectrum. Again, these procedures are based on the substantially proportional linearity of the relationship between the number of airfoils on a rotor at a rotational speed and the corresponding acoustic emission frequency over a range of rotational speeds.

This $n^{th}$ distribution altered baseline spectrum is further converted to a $n^{th}$ distribution altered noy value spectrum in a following block, 52, as described above, and stored in database 12 in a subsequent block, 53, as well having the noy values therein then summed by the computer in a further block, 54, across the acoustic spectrum frequency range in this $n^{th}$ distribution altered noy value spectrum to determine the corresponding perceived noise level for this nΔt sampling instant also as described above. The computer determines in a decision diamond, 55, whether it retained the $n^{th}$ distribution altered baseline spectrum from block 51 during the summation in block 55 to proceed further, or whether it must retrieve the $n^{th}$ distribution altered baseline spectrum from database 12 to proceed further.

The computer, upon so being ready to proceed further, enters the tone modification or correction process in a subsequent block, 56, to select what have now, after the peak shifting and redistributing, become the excess magnitude spectral peaks in the $n^{th}$ distribution altered baseline spectrum, and to therefrom determine the corresponding penalty value as described above. The computer adds this penalty value to the corresponding $n^{th}$ perceived noise level to thereby determine the $n^{th}$ distribution altered tone-corrected, or tone-modified, perceived noise level (PNLT). Upon completing this determination corresponding to the $n^{th}$ unaltered baseline spectrum (and the $n^{th}$ effective spectrum), the computer checks the sample counter to determine in a decision diamond, 57, if the count n kept therein has reached N. Such a count value indicates that all of unaltered baseline spectra for a flight or simulation have been operated on by the computer to determine the effective distribution altered perceived noise level for that flight or simulation. If not, the computer increments the sample counter in a further block, 58, and returns ahead of block 50 to operate on this next modified unaltered baseline spectrum.

If all of the modified unaltered baseline spectra have been operated on by the computer, the sample counter has n=N and the computer in a subsequent block, 59, retrieves from database 12 the N stored distribution altered tone-corrected, or tone-modified, perceived noise levels (PNLT), one for each sample effective spectrum, and Δt. The computer then sums in a further block, 60, these N stored distribution altered tone-corrected, or tone-modified, perceived noise levels and divides the result by the total time NΔt of the flight or the simulation to average these N stored distribution altered tone-corrected, or tone-modified, perceived noise levels over the time of the flight or simulation. Thus, the computer thereby provides the distribution altered effective perceived noise level (EPNL) of that flight or simulation in accord with the ICAO noise evaluation rules which is stored in database 12 in a next block, 61.

A further example of the results of this second estimated reconfiguration is shown in the graph of FIG. 7 in which the midpoints of the frequency bands in the equivalent ⅓ octave-band spectrum formed from an acoustic emission spectrum are plotted. The solid line plot portion up to the dashed line and that dashed line together are the modified unaltered baseline spectrum matching the one shown in FIG. 5 with a dominant spectral peak at 4000 Hz, and the entire solid line spectrum is the modified distribution altered baseline spectrum. The foregoing procedure is shown implementing through suitably estimated airfoil counts and rotor rotational speeds of the offending rotors a shifting and redistribution of the spectral in this peak at 4000 Hz in the modified unaltered baseline spectrum so as to promote "band-sharing" around 5000 Hz in the modified distribution altered baseline spectrum with, as indicated by use of "modified", the sound pressure level values accounting for atmospheric attenuation.

The unaltered and the resulting distribution altered PNLT time variations are shown in FIG. 8A. FIG. 8B again shows that this reconfiguration alters the location on the emission frequency axis of the maximum spectral peak is shifted from 4000 Hz to being about 5000 Hz, as expected, with an improvement in the associated EPNL values shown in FIG. 8C. The overall benefit in EPNL in this particular example is estimated to be about 1.0 dB.

The foregoing process for evaluating engine acoustic emission spectra for an engine configuration following the ICAO rules to determine the corresponding noise characteristics, and for estimating engine reconfigurations and the corresponding emissions spectra and noise characteristics, can be made a part of the larger computer aided engine design process by including as a design goal the desired EPNL value for the configuration being examined. A flow chart for such an inclusive engine design optimization process, 70, is shown in FIG. 9 which begins from the START balloon shown there by entering, in a block, 71, the design parameters and constraints specifying an initial engine configuration conceived as meeting the engine design goals, and storing same in database 12.

These parameters and constraints are converted by the computer to a an initial or preliminary turbine engine configuration in a further block, 72, and the computer simulates the performance of this configuration with respect to engine acoustic emissions in a following block, 73, to obtain the engine acoustic emissions flight time history from which the computer determines the engine configuration noise characteristics and seeks any needed improvements therefor in a subsequent block, 74. This undertaking by the computer in block 74 is based on the engine acoustic emissions flight time history to provide the engine acoustic emission spectrum for each sample point used in the previously described process in FIG. 4 which is indicated to be entered in block 74 and so again begins at the START balloon in FIG. 4A.

The computer checks the noise performance of the unaltered configuration in FIG. 4A and if the initial or preliminary engine configuration is found by the computer in decision diamond 29 in FIG. 4A to meet the ICAO noise requirements, the computer exits the FIG. 4 process, as described above, by proceeding from diamond 29 to balloon B in that figure and in FIG. 4B, and through balloon D in that latter figure and FIG. 4C to the STOP balloon in this last figure to thereby reach a decision diamond, 75, in FIG. 9. If, in the alternative, the initial or preliminary engine configuration is found by the computer in decision diamond 29 of FIG. 4A to not meet the ICAO noise requirements, the computer determines by proceeding from diamond 29 in FIG. 4A to a further decision diamond, 76, in that figure. The computer there determines whether it is operating a) in the FIG. 4 process to evaluate the noise characteristics of an initial or preliminary engine design in block 74 of FIG. 9 to pick a more suitable configuration for reaching an engine noise emissions performance goal in guiding further engine development, or is operating b) in the FIG. 4 process to evaluate the noise performance of a more fully developed engine configuration design that has been optimized for reaching all of the engine performance goals which evaluation occurs beginning in such a FIG. 4 process evaluation block located further along in the FIG. 9 process to be further described below.

If the computer determines it is operating in the configuration choice guidance effort of block 74 in FIG. 9, the computer proceeds from this determination in decision diamond 76 in FIG. 4A to balloon A and on to find the engine configuration variants that may be developed in continuing through the flow charts in FIGS. 4B and 4C to reach the STOP balloon in this last figure, and from there moves to decision diamond 75 in FIG. 9. If, in the alternative, the computer determines in decision diamond 76 in FIG. 4A that it is evaluating a more fully developed, optimized engine configuration design because of having entered the FIG. 4 process evaluation block to be described below, the computer provides only the noise characteristics evaluation of FIG. 4A for the unaltered engine configuration and exits the FIG. 4 process by again proceeding from decision diamond 76 in FIG. 4A to balloon B in that figure and FIG. 4B, and through balloon D in that latter figure and FIG. 4C to the STOP balloon in this last figure. From there, the computer moves from this FIG. 4 process evaluation block in FIG. 9 to be described below to a subsequent decision diamond in FIG. 9 that will also be described below.

However, at the present point in the description of FIG. 9, the computer will be in the configuration choice guidance effort of block 74 in FIG. 9, and the computer will have gone through the FIG. 4 process there to either find that the initial or preliminary engine configuration design meets the ICAO noise requirements or will have provided reconfiguration variants estimated to better do so, and so, in either situation, will reach the STOP balloon in FIG. 4C from where the computer moves to decision diamond 75 in FIG. 9. There, the computer determines whether it has all of the results from performing the FIG. 4 process in block 74 of FIG. 9 and, if not, proceeds to get from database 12 any that it does not have of the unaltered effective perceived noise level which at a minimum will have been found in that process, and possibly also the shift altered perceived and the distribution altered perceived noise levels that may have also been found in that process. Once the computer has all of these results, it chooses the one of them in a subsequent block, 77, that provides the minimum perceived noise level. Of course, in the first instance of the engine initial or preliminary design having met the ICAO noise requirements, by default the choice must be the unaltered effective perceived noise level.

If either of the shift altered perceived noise level and the distribution altered perceived noise level have been found in block 74, and one is chosen as the minimum, the computer determines if accommodating the corresponding noise characteristic based configuration change requires other engine configuration design changes in a further decision diamond, 78. If so, a modified accommodation engine reconfiguration is determined in a next block, 79, sufficient to provide an operable engine which then undergoes a design optimization process in a further block, 80, subject to the objective function involving such goals engine weight, engine fuel consumption, engine acoustic emissions, engine cost, etc., and the design constraints based on various relationships between the engine structural and operating parameters, all earlier stored in database 12 which are retrieved therefrom in block 80. The design parameters from this optimization process are then stored in database 12 in a following block, 81.

The performance of the optimal turbine engine configuration found in block 80 is then found by simulation in a further block, 82, including the flight time acoustic emissions history. That history provides the engine acoustic emission spectrum for each sample point to be the basis for beginning the FIG. 4 process again in a subsequent block, 83, this being the FIG. 4 process block indicated above to be later described and which is distinguished from block 74 by the computer in decision diamond 76 of FIG. 4A. The more fully developed optimized engine configuration design found in block 80 is, as indicated above, subjected to only the noise characteristics evaluation process of FIG. 4A for the unaltered configuration found in block 80, whether that configuration meets the ICAO rules noise limits or not, as the computer exits the FIG. 4 process through decision diamond 29 if the limits are met, or through decision diamond 76 if the limits are not met. Either of these diamonds takes the computer to balloon B in FIGS. 4A and 4B, balloon D in FIGS. 4B and 4C and then to the STOP balloon in FIG. 4C.

The computer emerges from the FIG. 4 process in block 83 to move to a further decision diamond, 84, this being the decision diamond also indicated above to be later describe, and in which a broader test of the optimized engine configuration found in block 80 is undertaken to determine if this configuration has met all of the engine requirements including the acoustic emission noise rules limits. If the optimized turbine engine configuration has not met all of the turbine engine requirements, or has met them in an unacceptable manner, the computer uses various methods to estimate what tradeoffs between engine goals in the objective function can be accepted, if any, and what changes can and should be made in the constraining engine structural and operating parameters, to meet, or better meet, these requirements and forms a corresponding set of modified design parameters in a subsequent block, 85. Then the computer moves ahead of block 72 to begin going through most of engine design optimization process 70 again with the computer determining a preliminary turbine engine configuration from the design parameters found in block 85 in view of the unchanged parameters and constraints, if any, previously stored in database 12 in block 71. These processes repeat continue until a turbine engine configuration is found to meet the turbine engine requirements in decision diamond 84 upon which the process ends in a last block, 86.

Although the present invention has been described with reference to preferred embodiments, workers skilled in the art will recognize that changes may be made in form and detail without departing from the spirit and scope of the invention.

The invention claimed is:

1. A method for determining how well configurations for a gas turbine propulsion system attain selected acoustic wave energy emissions criteria, said method comprising:
   acquiring a noise representation of acoustic energy emissions for a gas turbine propulsion system of an initial configuration over an operating time duration;
   providing a plurality of unaltered acoustic frequency spectra representations of the noise representation each corresponding to one of a plurality of selected sample times occurring during the operating time duration;
   evaluating each unaltered acoustic frequency spectrum representation to provide a corresponding noise parameter value for each such spectrum representation to together provide a plurality of noise measurement parameter values corresponding thereto;
   averaging the plurality of noise measurement parameter values corresponding to each unaltered acoustic frequency spectrum representation to provide an operating parameter noise value corresponding to the unaltered acoustic frequency spectra representations;
   locating relative peaks in the unaltered acoustic frequency spectra representations and altering forms of at least one of those peaks with respect to acoustic frequency in at least one alteration manner substantially matching acoustic wave energy emissions changes corresponding to a configuration change in gas turbine propulsion systems to thereby form a corresponding altered acoustic frequency spectra representations;
   evaluating each altered acoustic frequency spectrum representation corresponding to an alteration manner to provide a corresponding noise parameter value for each such spectrum representation to together provide a plurality of noise measurement parameter values corresponding to that alteration manner;
   averaging the plurality of noise measurement parameter values corresponding to an alteration manner to provide an operating parameter noise value corresponding to that alteration manner; and
   determining that of the operating parameter noise values best meeting the selected acoustic wave energy emissions criteria to identify the corresponding configuration change, if any, to aid in determining if there should be a configuration change from the initial configuration and what that change should be.

2. The method of claim 1 wherein the acquiring of a noise representation of acoustic energy emissions of the gas turbine propulsion system in the operating time duration comprises measuring those acoustic energy emissions of the gas turbine propulsion system during operation thereof.

3. The method of claim 2 wherein the measuring of acoustic energy emissions of the gas turbine propulsion system and the providing of a plurality of acoustic frequency spectra representations of the noise representation each corresponding to one of a plurality of selected sample times occurring during the operating time duration is accomplished using a spectrum analyzer.

4. The method of claim 3 wherein the providing of a plurality of acoustic frequency spectra representations of the noise representation each corresponding to one of a plurality of selected sample times occurring during the operating time duration comprises for each of the plurality of acoustic frequency spectra representations provided by the spectrum analyzer providing another corresponding acoustic frequency spectrum formed from a plurality of one-third octave frequency bands with a sound pressure level value for each band obtained by averaging sound pressure levels of those acoustic frequencies in that band in the corresponding acoustic frequency spectrum from which it is formed.

5. The method of claim 1 wherein the acquiring of a noise representation of acoustic energy emissions of the gas turbine propulsion system comprises calculating those acoustic energy emissions of the gas turbine propulsion system during a computer based simulation of operation thereof over the operating time duration.

6. The method of claim 5 wherein the acquiring of a noise representation of acoustic energy emissions and the providing of a plurality of acoustic frequency spectra representations of the noise representation each corresponding to one of a plurality of selected sample times occurring during the operating time duration comprises calculating each of the plurality of acoustic frequency spectra representations during a computer based simulation of operation thereof over the operating time duration.

7. The method of claim 6 wherein the calculating each of the plurality of acoustic frequency spectra representations during a computer based simulation of operation thereof over the operating time duration comprises calculating it as an acoustic frequency spectrum formed from a plurality of one-third octave frequency bands with an averaged over frequency sound pressure level.

8. The method of claim 1 wherein the altering of forms of at least one of the relative peaks in an acoustic frequency spectrum representation with respect to acoustic frequency comprises a computer calculating a position for that relative peak farther along a frequency scale in that acoustic frequency spectrum representation to form a corresponding altered acoustic frequency spectra representation.

9. The method of claim 8 wherein the computer calculates the number of airfoils to add to that rotor giving rise to that relative peak in the acoustic frequency spectrum representation.

10. The method of claim 1 wherein the altering of forms of at least one of the relative peaks in an acoustic frequency spectrum representation with respect to acoustic frequency comprises a computer calculating a distribution of acoustic energy over broader frequency range for that relative peak at a position farther along a frequency scale in that acoustic frequency spectrum representation to form a corresponding altered acoustic frequency spectra representation.

11. The method of claim 10 wherein the computer calculates the number of airfoils to change in the airfoil counts on those rotors giving rise to that relative peak in the acoustic frequency spectrum representation and any rotation speed changes to be required for those rotors.

12. The method of claim 1 wherein the evaluating of an altered acoustic frequency spectrum comprises multiplying the unaltered acoustic frequency spectrum by an atmospheric attenuation characteristic to form a modified unaltered acoustic frequency spectrum.

13. The method of claim 12 wherein the evaluating of an altered acoustic frequency spectrum further comprises converting the altered acoustic frequency spectrum to an altered noy value spectrum, summing the noy values to provide a noy value sum, finding an excess magnitude spectral peak in the altered noy value spectrum and determining a corresponding penalty value, adding the penalty value to the noy value sum to provide an altered tone-corrected perceived noise level.

14. The method of claim 13 wherein the averaging of the plurality of noise measurement parameter values further comprises summing the altered tone-corrected perceived noise level of each of the altered acoustic frequency spectra representations to provide a summing result and dividing the summing result by the operating time duration.

15. A method for determining suitable configurations for a gas turbine propulsion system to exhibit selected structural and operating parameters values during operations thereof subject to selected constraints on those values, the method comprising:
   determining a gas turbine propulsion system initial configuration corresponding to the selected structural and operating parameters values and the constraints thereon;
   simulating the gas turbine propulsion system initial configuration acoustic emissions history over an operating time duration;
   determining selected acoustic wave energy emissions criteria for the gas turbine propulsion system initial configuration and for selected emission tone altered configurations altered from the gas turbine propulsion system initial configuration;
   choosing a gas turbine propulsion system accommodation configuration based on that one of the gas turbine propulsion system initial and emission tone altered configurations having the most favorable corresponding selected acoustic wave energy emissions criteria;
   optimizing the gas turbine propulsion system accommodation configuration with respect to selected objectives and the selected constraints;
   simulating the gas turbine propulsion system accommodation configuration performance over the operating time duration including the acoustic emissions history thereof;
   determining whether the gas turbine propulsion system accommodation configuration meets selected performance requirements;
   estimating those changes required to the selected structural and operating parameters to allow another gas turbine propulsion system configuration to meet the selected performance requirements based on the gas turbine propulsion system accommodation configuration if these requirements have not been met by the gas turbine propulsion system accommodation configuration;
   forming corresponding modified selected structural and operating parameters based on the estimated changes as a basis for forming a gas turbine propulsion system preliminary configuration; and
   repeating the simulating of the gas turbine propulsion system initial configuration acoustic emissions history over an operating time duration with the gas turbine propulsion system preliminary configuration substituted for the gas turbine propulsion system initial configuration to continue in the foregoing method from that step.

16. The method of claim 15 wherein the determining of whether the gas turbine propulsion system accommodation configuration meets the selected performance requirements terminates that method if the gas turbine propulsion system accommodation configuration does meet those selected performance requirements.

17. The method of claim 15 wherein the determining of selected acoustic wave energy emissions criteria for the gas turbine propulsion system initial configuration and for selected emission tone altered configurations altered from the gas turbine propulsion system initial configuration comprises:
   acquiring a noise representation of acoustic energy emissions for a gas turbine propulsion system of the initial configuration over the operating time duration;
   providing a plurality of unaltered acoustic frequency spectra representations of the noise representation each corresponding to one of a plurality of selected sample times occurring during the operating time duration;
   evaluating each unaltered acoustic frequency spectrum representation to provide a corresponding noise parameter value for each such spectrum representation to together provide a plurality of noise measurement parameter values corresponding thereto;
   averaging the plurality of noise measurement parameter values corresponding to each unaltered acoustic frequency spectrum representation to provide an operating parameter noise value corresponding to the unaltered acoustic frequency spectra representations;
   locating relative peaks in the unaltered acoustic frequency spectra representations and altering forms of at least one of those peaks with respect to acoustic frequency in at least one alteration manner substantially matching acoustic wave energy emissions changes corresponding to a configuration change in gas turbine propulsion systems to thereby form a corresponding altered acoustic frequency spectra representations;
   evaluating each altered acoustic frequency spectrum representation corresponding to an alteration manner to provide a corresponding noise parameter value for each such spectrum representation to together provide a plurality of noise measurement parameter values corresponding to that alteration manner;
   averaging the plurality of noise measurement parameter values corresponding to an alteration manner to provide an operating parameter noise value corresponding to that alteration manner; and
   determining that of the operating parameter noise values best meeting the selected acoustic wave energy emissions criteria to identify the corresponding configuration change, if any, to aid in determining if there should be a configuration change from the initial configuration and what that change should be.

18. The method of claim 17 wherein the determining of whether the gas turbine propulsion system accommodation configuration meets the selected performance requirements terminates that method if the gas turbine propulsion system accommodation configuration does meet those selected performance requirements.

19. The method of claim 18 wherein determining whether the gas turbine propulsion system accommodation configuration meets selected performance requirements comprises including:
   acquiring a noise representation of acoustic energy emissions for the gas turbine propulsion system accommodation configuration over the operating time duration;
   providing a plurality of unaltered acoustic frequency spectra representations of the noise representation each corresponding to one of a plurality of selected sample times occurring during the operating time duration;
   evaluating each unaltered acoustic frequency spectrum representation to provide a corresponding noise parameter value for each such spectrum representation to together provide a plurality of noise measurement parameter values corresponding thereto;

averaging the plurality of noise measurement parameter values corresponding to each unaltered acoustic frequency spectrum representation to provide an operating parameter noise value corresponding to the unaltered acoustic frequency spectra representations; and determining whether the operating parameter noise value meets the selected acoustic wave energy emissions criteria.

20. The method of claim 19 wherein the determining of whether the gas turbine propulsion system accommodation configuration meets the selected performance requirements terminates that method if the gas turbine propulsion system accommodation configuration does meet those selected performance requirements.

* * * * *